United States Patent
Hardouin

(10) Patent No.: US 11,653,260 B2
(45) Date of Patent: May 16, 2023

(54) METHOD FOR SIGNALING IN A CELLULAR TELECOMMUNICATIONS NETWORK

(71) Applicant: Orange, Paris (FR)

(72) Inventor: Eric Hardouin, Paris (FR)

(73) Assignee: ORANGE, Issy-les-Moulineaux (FR)

( * ) Notice: Subject to any disclaimer, the term of this patent is extended or adjusted under 35 U.S.C. 154(b) by 385 days.

(21) Appl. No.: 14/778,567

(22) PCT Filed: Mar. 19, 2014

(86) PCT No.: PCT/FR2014/050644
§ 371 (c)(1),
(2) Date: Sep. 18, 2015

(87) PCT Pub. No.: WO2014/147345
PCT Pub. Date: Sep. 25, 2014

(65) Prior Publication Data
US 2016/0286431 A1 Sep. 29, 2016

(30) Foreign Application Priority Data
Mar. 19, 2013 (FR) ...................... 1352453

(51) Int. Cl.
*H04W 28/04* (2009.01)
*H04W 72/04* (2023.01)
(Continued)

(52) U.S. Cl.
CPC ........... *H04W 28/04* (2013.01); *H04J 11/003* (2013.01); *H04J 11/005* (2013.01); *H04W 72/042* (2013.01); *H04W 72/082* (2013.01)

(58) Field of Classification Search
CPC ...... H04J 11/003; H04J 11/005; H04W 28/04; H04W 72/042; H04W 72/082
See application file for complete search history.

(56) References Cited

U.S. PATENT DOCUMENTS

| 2010/0035621 | A1  |  2/2010 | Chun et al. |
| 2010/0255852 | A1* | 10/2010 | Chen .................... H04W 72/082 455/450 |
| 2011/0044282 | A1* |  2/2011 | Seo ........................ H04L 5/0053 370/329 |

(Continued)

FOREIGN PATENT DOCUMENTS

| WO | WO 2009/121025 | 10/2009 |
| WO | WO 2010/036006 | 4/2010 |
| WO | WO 2010/108136 | 9/2010 |

OTHER PUBLICATIONS

NOKIA Siemens Networks, R1-090232: "Comparing performance, complexity and latency of SC-FDMA SIC and OFDM MLD", 3GPP TSG RAN WG1 Meeting, Ljubljana, Slovenia, Jan. 12-16, 2009 Agenda Item 12.1; pp. 14.

(Continued)

*Primary Examiner* — Jason E Mattis
*Assistant Examiner* — Bao G Nguyen
(74) *Attorney, Agent, or Firm* — Knobbe, Martens, Olson & Bear, LLP

(57) ABSTRACT

A method for implementation by a base station controlling at least one cell of the network is provided. It may comprise allocating to an interferer terminal attached to the cell and identified by the base station as being capable of interfering with at least one communication established by this terminal or to a neighbor cell an open temporary network identifier shared by a predetermined number of interferer terminals attached to the cell and a code making it possible to identify the interferer terminal among these interferer terminals, publishing this identifier, sending to the interferer terminal, in at least one configuration message, of the open temporary network identifier and the code and inserting this code, in a field of a physical control channel allocating resources for transmitting over the cellular network to the interferer (Continued)

terminal, this physical channel being encoded using the open temporary network identifier and emitted on the network.

18 Claims, 2 Drawing Sheets

(51) Int. Cl.
*H04J 11/00* (2006.01)
*H04W 72/08* (2009.01)

(56) References Cited

U.S. PATENT DOCUMENTS

| | | | |
|---|---|---|---|
| 2011/0124360 A1 | 5/2011 | Sagfors et al. | |
| 2012/0243462 A1 | 9/2012 | Bucknell et al. | |
| 2012/0317242 A1* | 12/2012 | Du | H04L 67/06 709/219 |
| 2013/0039202 A1* | 2/2013 | Feuersanger | H04L 5/0098 370/252 |
| 2013/0107816 A1* | 5/2013 | Iraji | H04W 72/042 370/329 |
| 2016/0157277 A1 | 6/2016 | Hardouin | |

OTHER PUBLICATIONS

3GPP, "Evolved Universal Terrestrial Radio Access (E-UTRA); Multiplexing and channel coding", Document TS 36.212 v11.1.0, Release 11, Dec. 2012; pp. 82.

3GPP, "Evolved Universal Radio Access (E-UTRA): Physical Layer Procedures (Release 11)", Document TS 36.213 v11.0.0, Release 11, Sep. 2012, Section 9.1.1.; pp. 143.

3GPP, "Evolved Universal Terrestrial Radio Access (E-UTRA); Radio Resource Control (RRC); Protocol Specification", (Release 11), Document TS 36.331 v11.2.0, Release 11, Dec. 2012; pp. 340.

International Search Report dated Jul. 25, 2014 for International Application No. PCT/FR2014/050634 filed Mar. 19, 2014, 5 pages.

International Search Report dated Jul. 25, 2014 for International Application No. PCT/FR2014/050644 filed Mar. 19, 2014, 5 pages.

3GPP, "Evolved Universal Terrestrial Radio Access Network (E-UTRAN); X2 application protocol (X2AP)" (Release 11), Document TS 36.423 v11.4.0, Mar. 2013; pp. 144.

3GPP, "Coordinated Multi-Point operation for LTE physical layer aspects", (Release 11), Document TR 36.819 v11.1.0; Dec. 2011; pp. 69.

* cited by examiner

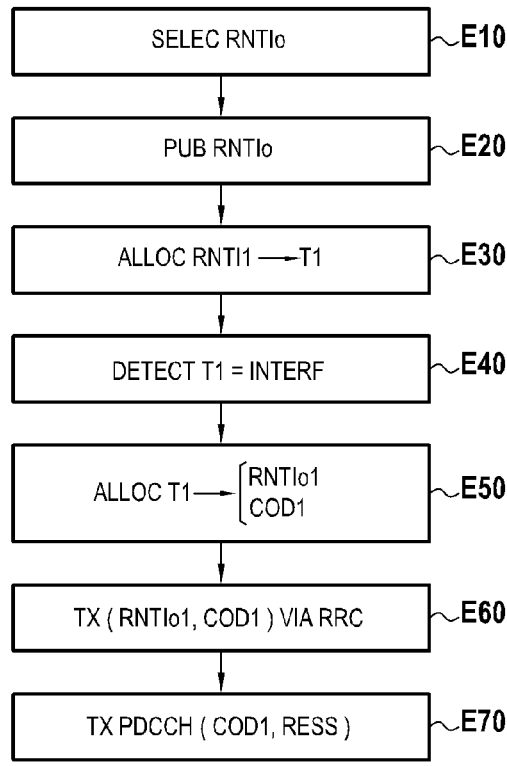
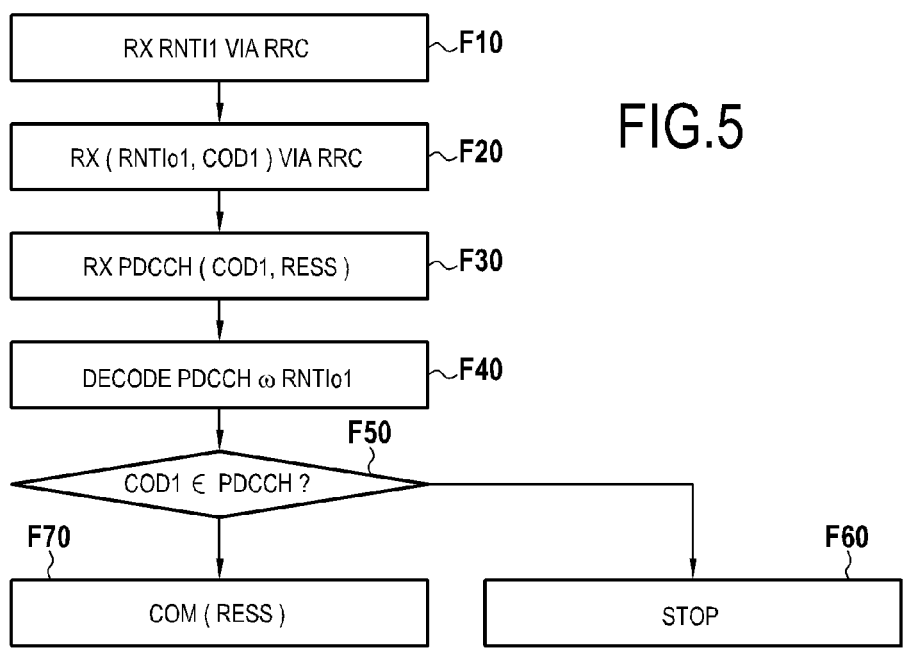
FIG.4
FIG.5

METHOD FOR SIGNALING IN A CELLULAR TELECOMMUNICATIONS NETWORK

RELATED APPLICATIONS

This application is the U.S. National Phase of Application No. PCT/FR2014/050644 entitled "METHOD FOR SIGNALING IN A CELLULAR TELECOMMUNICATIONS NETWORK" filed Mar. 19, 2014, which designated the United States, and which claims the benefit of French Application No. 1352453 filed Mar. 19, 2013.

BACKGROUND OF THE INVENTION

The invention relates to the general field of telecommunications.

It more particularly concerns the signaling, in a cellular telecommunications network, of resources allocated to a terminal to communicate over this network.

The invention thus has a favored, but not limiting, application in the context of LTE (Long Term Evolution) cellular mobile telecommunications networks as defined by the 3GPP (Third Generation Partnership Project), and notably on the downlink, i.e. in the direction of communication from the base station (or eNodeB) toward the mobile terminals (or UE for User Equipment).

In a known manner, the capacity of cellular mobile telecommunications networks, and in particular that of LTE networks, is limited by interference. This interference can be of different natures. Among the most damaging in terms of cellular network capacity, are:

- SU-MIMO interference (for Single User-Multiple Input Multiple Output) related to the use of multiple transmitting and receiving antennas, and which corresponds to the interference generated between MIMO data streams allocated to one and the same terminal;
- MU-MIMO interference (for Multiple User-Multiple Input Multiple Output) which corresponds to the interference generated between MIMO data streams allocated to different terminals; and
- Intercellular interference, generated between signals emitted by different cells and intended for different terminals.

Various methods making it possible to reduce the effect of this interference on the performance of the network are known to the prior art.

Thus, interference of SU-MIMO and MU-MIMO type can notably be treated using a precoding technique applied to emission. This method consists in the application of complex weightings to the streams of data emitted by the antennas of the base station so as to attribute particular spatial properties thereto (for example a favored direction). Thus, for example, via this precoding it would be possible to separate in space the streams intended for one and the same terminal (in the SU-MIMO case) or to different terminals (in the MU-MIMO case) in order to allow the receiver terminal to detect each stream with a reduced interference from the other streams.

The intercellular interference can be reduced via the use of so-called CoMP (for Coordinated MultiPoint) techniques, aiming to coordinate the allocation of resources and the precoding implemented by the base stations controlling the neighbor cells of a given cell, so as to minimize the interference created on this cell by its neighbor cells. These techniques are described in more detail in the document TS 36.819 entitled "Coordinated Multi-Point operation for LTE physical layer aspects", Release 11, edited by the 3GPP.

The most effective precoding techniques used to reduce MU-MIMO interference and/or intercellular interference require precise knowledge at the emitter of the transmission channel of the different terminals. Such knowledge is generally not available at the base station (eNodeB), because it requires considerable signaling on the feedback link between each terminal and the base station.

In order to limit this signaling, the information relating to the knowledge of the channel is generally quantified. There follows a loss of precision so that the interference is not in practice totally suppressed by precoding: a non-negligible proportion of residual interference subsists, which affects the terminal performance.

To remedy this drawback, it is known to use, at the terminals, non-linear receivers implementing interference cancellation, such as for example MMSE-SIC receivers (for Successive Interference Cancellation). In general, for the sake of simplicity in the case of a single interferer, such a receiver estimates the interfering stream of data (corresponding to interference of MU-MIMO or intercellular type) for example by implementing a step of (channel) decoding of the signal of the corresponding interferer. Then based on this estimate of the stream, on the estimate of the channel of the interferer and on the knowledge of the transmission parameters allocated to this interferer, the receiver reconstructs the interfering signals received by the terminal. The reconstructed interfering signal is then subtracted from the signal received by the terminal, the signal thus cleansed of the interference being then used to detect the useful signal intended for the terminal.

SIC non-linear receivers can process one or more interfering data streams intended for one or more so-called interferer terminals. However, as stated previously, the process of cancelling the interference implemented by these non-linear receivers requires the knowledge of the transmission parameters of the interferer(s) and particularly, in the context of an LTE telecommunications network, of the modulation and coding scheme associated with each interferer, of the physical resource blocks (PRB), where applicable of the dedicated pilot sequence (known as DMRS for DeModulation Reference Signal) if it is used, and of the Radio Network Temporary Identifier (RNTI) allocated uniquely to the interferer terminal to identify it on the cell to which it is attached.

For these reasons, MMSE-SIC receivers with interference channel decoding are commonly considered to process SU-MIMO interference, since the terminal equipped with the MMSE-SIC receiver has access to all the transmission parameters of the various streams that are transmitted thereto. On the other hand, their use for processing downlink MU-MIMO and intercellular interference is more complex.

To better illustrate this statement, it is advisable to recall how the allocation of transmission parameters in an LTE network is carried out, and more particularly how the signaling of the transmission parameters thus allocated is carried out.

For the sake of simplicity, only intercellular interference will be addressed, knowing that equivalent statements also apply to MU-MIMO interference.

The transmission parameters are allocated to each terminal by the base station controlling the cell to which the terminal is attached. They are, with the exception of the RNTI identifier, communicated to each terminal via a dedicated Physical Downlink Control Channel named PDCCH. The RNTI identifier is signaled to the terminal in a dedicated signaling message, and more specifically in a configuration message transmitted over the PDSCH channel (Physical Downlink Shared Channel) managed by the upper layers of the network, and particularly by the RRC (for Radio Resource Control) layer.

The PDCCH channel is organized according to several possible formats, known as DCI (for Downlink Control Information) format, A DCI format includes several fields, each field bearing a particular item of information (e.g. transport block or PRB (Physical Resource Block) allocated (one or two transport blocks can be allocated), Modulation and Coding Schemes (or MCSs) allocated for each transport block, etc.). The information bits of a PDCCH channel (i.e. the bits of the DCI format) are then associated with a CRC (Cyclic Redundancy Check) code to allow error detection. The peculiarity of this CRC code is that is it scrambled with the RNTI identifier of the terminal to which the PDCCH channel is intended. This allows the terminal to validate that the PDCCH channel it is decoding is indeed addressed to it. Specifically, if another terminal (which possesses a different RNTI identifier) attempts to verify the validity of the PDCCH channel using this other RNTI identifier, the verification of the CRC code returns an error thereto.

The information bits as well as the bits of the CRC are then encoded using a convolutional code, then scrambled by a sequence specific to the cell, before being modulated in QPSK then transmitted. The effective rate of the convolutional code, which depends on the rate of the code as well as the data rate adaptation carried out at the output of the encoder to adapt the number of coded bits to the resources available, is adapted to the protection level required by the radio conditions of the terminal to which the PDCCH channel is intended. Thus, a PDCCH channel intended for a terminal that is in good radio conditions (for example close to the base station serving it) does not need much protection and is transmitted with a high effective rate, or in other words over a low number of resources. Conversely, a terminal in poor radio conditions, is allocated a PDCCH channel with a low effective rate, and occupying a higher number of resources.

In LTE networks, the resources occupied by a PDCCH channel allocated to a terminal are not known in advance by the latter. The terminal must therefore test a set of possible resource combinations, and for each candidate combination attempt to decode a PDCCH channel potentially transmitted over these resources with its RNTI identifier, to determine if it is intended for it. All the candidate resources for a given terminal is called a search space, and described in document 3GPP TS 36.213 v11.0.0 entitled "Evolved Universal Radio Access; Physical Layer Procedures (Release 11)", September 2012, in section 9.1.1 in particular. The position of the search space depends in particular on the value of the RNTI.

It will thus be understood that the only possible solution for allowing a terminal suffering intercellular or MU-MIMO interference to acquire the knowledge of the transmission parameters of its interferers in order to be able to implement an MMSE-SIC processing method to cancel this interference, is to attempt to decode in a blind mannerall the PDCCH channels of the interfering cell(s) (i.e. of the cells serving interferer terminals for the terminal equipped with the MMSE-SIC receiver).

In other words, for each interfering cell, the "victim" terminal most examine each PDCCH channel likely to have been transmitted over search space resources corresponding to different values of RNTI, until all the PDCCH channels effectively transmitted are found. As the victim terminal does not have knowledge of the RNTI identifiers allocated to the other terminals, a test of all the possible RNTI values must be carried out Once all the PDCCH transmitted by the interfering cell in question are decoded, the victim terminal can know which are the terminals of this cell that are transmitted on the same resources as it and which represent interferers for it. In addition, the victim terminal has access to the transmission parameters of its interferers and can thus cancel their interference using an MMSE-SIC technique.

This solution has two major drawbacks: first of all, the blind decoding of the various PDCCH channels of a cell is a very complex and particularly long operation due to the processing implemented. It is moreover a great consumer of energy of the terminal battery. The further application of such a blind decoding to several interfering cells to allow the use of a MMSE-SIC processing with a view to eliminating the intercellular interference is all the harder to envision.

In addition, the need to test for each candidate PDCCH all the possible values for the RNTI identifier (there are $2^{16}$), in order to determine both the latter and the validity of the candidate PDCCH, renders this method almost impossible to implement with realistic computation means.

The document WO 2010/108136 proposes a method making it possible to facilitate the cancellation of intercellular interference in a mobile telecommunications network, and particularly in an LTE network.

This method consists in dividing all the RNTI temporary identifiers available for a cell into two subsets: a first subset of RNTI identifiers (that will be named in "open" RNTIs in the remainder of this document) intended for terminals liable (i.e. likely or capable) to cause interference, and a second subset of RNTI identifiers intended for terminals liable to suffer interference. The open RNTI identifiers of the first subset are published (i.e. broadcast), so as to be known to the terminals of the neighbor cells. Each open RNTI identifier uniquely identifies a terminal.

Thus, a base station of a cell wishing to perform the transmission from a PDCCH channel toward an interferer terminal decodable by a terminal of a neighbor cell can use to do this an open RNTI identifier. The decoding of the PDCCH channels by a terminal that is a victim of interference to acquire the transmission parameters of its interferers is therefore facilitated since it can be limited to open RNTIs published by the cells, as well as to the corresponding search spaces.

Document WO 2010/108136 proposes to signal to a terminal that one (or more) open RNTI identifier has or have been allocated to it by sending this open RNTI identifier to it via the PDCCH control channel or via a shared physical channel PDSCH (Physical Downlink Shared CHannel). On receiving this identifier, the terminal in question can then decode the PDCCH channels that are intended for it using the open RNTI identifier that has been allocated to it.

Such a signaling method can turn out to be costly in terms of signaling resources, particularly when a large number of open RNTI identifiers is allocated, each RNTI being coded on 16 bits as per the LTE standard. Specifically, a signaling of an open RNTI via a PDCCH channel involves adding the 16 bits of the open RNTI to the DCI format of this PDCCH channel, which diminishes the coverage of the PDCCH channel, particularly when the terminal is at the edge of the cell and is already using the most robust DCI format (i.e. that which occupies the maximum number of resources that can be allocated to a PDCCH channel).

This is all the more so when the "interferer" status of a terminal in the same way as the resources that are allocated to it are likely to evolve rapidly over time, and thus to require a high degree of signaling.

Moreover, as mentioned previously, according to this method, an open RNTI identifier uniquely identifies an interferer terminal. However, the number of terminals served by a base station of a cell can be high (several tens or even hundreds of terminals). The attribution of a large number of open RNTI identifiers by a base station of a cell thus leads to high computational complexity for the decoding of the associated PDCCH channels, as well as high energy consumption for the terminals implementing a successive interference cancellation method.

SUBJECT AND SUMMARY OF THE INVENTION

The invention notably makes it possible to palliate the aforementioned drawbacks by proposing a signaling method, intended to be implemented by a base station of a cellular telecommunications network, this base station controlling at least one cell of the network, the signaling method comprising:
- a step of allocating (i.e. attributing), to an interferer terminal attached to this cell and being identified by the base station as being capable of (i.e. likely to) interfering with at least one communication established by another terminal attached to this cell or to a neighbor cell:
  - of a so-called open temporary network identifier, intended to be shared by a predetermined number of interferer terminals attached to the cell controlled by the base station; and
  - of a code making it possible to identify the interferer terminal among this predetermined number of interferer terminals;
- a step of publishing this open temporary network identifier;
- a step of sending to the interferer terminal, in at least one configuration message, the open temporary network identifier and the code that are allocated to it; and
- a step of inserting this code, in a field of a physical control channel allocating resources for transmitting over the cellular network to the interferer terminal, this physical channel being encoded using the open temporary network identifier allocated to the interferer terminal and emitted over the cellular network.

Correlatively, the invention also provides a base station of a cellular telecommunications network, controlling at least one cell of the network and comprising:
- a module for allocating, to an interferer terminal attached to this cell and identified as being capable of interfering with at least one communication established by another terminal attached to said cell or to a neighbor cell:
  - of a so-called open temporary network identifier, intended to be shared by a predetermined number of interferer terminals attached to the cell controlled by the base station; and
  - of a code making it possible to identify the interferer terminal among this predetermined number of interferer terminals;
- a module for publishing this open temporary network identifier;
- a module for sending to the interferer terminal, in at least one configuration message, of the open temporary network identifier and the code allocated to the interferer terminal;
- a module for inserting this code, in a field of a physical control channel allocating resources for transmitting over the cellular network to the interferer terminal;
- a module for encoding this physical channel using the open temporary network identifier allocated to the interferer terminal; and
- a module for emitting this physical channel over the cellular network.

For the sake of simplicity, it will be understood in the sense of the invention by "interferer terminal capable of interfering with a communication established by another terminal" (or "victim" terminal), that the transmissions towards the interferer terminal originating from the cell to which it is attached (or more precisely from the base station controlling this cell) constitute interference signals for the communication established by the victim terminal.

The term "publication of the open temporary network identifier" is understood to mean the fact of bearing this open temporary network identifier to the knowledge of the other terminals, in other words to make it public or broadcast it, so that these terminals can decode the associated PDCCH physical channel with this identifier and intended for said single terminal (in other words, coded with this identifier), and thus determine the transmission parameters allocated to the terminal(s) to which this open temporary network identifier is allocated, in order to suppress the interference generated by the latter, for example using a successive interference cancellation method.

For this purpose, the step of publishing the open temporary network identifier can in particular comprise broadcasting this identifier to the terminals attached to the cell controlled by the base station, for example via system information broadcast by the base station within this cell.

This variant allows the terminals attached to the same cell as the interferer terminal to quickly identify the transmission parameters of this terminal (i.e. the resources allocated to this terminal) and thus be able to eliminate the MU-MIMO interference generated by this interferer terminal.

In a variant, the step of publishing the open temporary network identifier can comprise broadcasting this identifier to the terminals attached to at least one other cell controlled by the some base station, and neighbor of the cell serving the interferer terminal.

According to another variant, the publishing of the open temporary network identifier can comprise broadcasting this identifier to at least one other base station controlling a neighbor cell of the cell serving the interferer terminal (typically to the neighbor cell(s) serving the interfered terminal(s)).

This variant is particularly suitable for the suppression of intercellular interference.

The publication of the open network identifier to the terminals of the cell or of the neighbor cell(s) is performed independently of their status vis-a-vis the interferer terminals.

In other words, the invention is applicable to the suppression of MU-MIMO interference as to the suppression of intercellular interference.

It proposes a semi-static configuration of a given interferer terminal according to an open temporary identifier shared by a predetermined number of interferer terminals, and an additional code making it possible to discern this given interferer terminal among this plurality of interferer terminals.

This additional code is inserted as is it in a field of the physical control channel. The physical control channel including the additional code is encoded with the open temporary network identifier. This additional code makes it possible to indicate, in each control channel encoded using the open temporary identifier, for which interferer terminal among the plurality of interferer terminals this control channel is intended, with limited resources. Thus, the method according to the invention can designate in each transmission time interval (or TTI), to which terminal among the plurality of interferer terminals sharing a same open temporary identifier, is allocated this identifier for this TTI.

Thanks to the invention, it is thus possible to serve a plurality of interferer terminals with one and the same open RNTI identifier: the invention thus makes it possible to avoid having to frequently reallocate (for example in each TTI) an open RNTI identifier among several interferer terminals as a function of the status (interferer or not) that the base station attributes them. A gain in signaling terms is another result thereof.

The solution proposed by the invention is consequently very flexible and makes it possible to adapt to a rapid evolution in the interferer/non-interferer status of the terminals, in other word to a rapid evolution in the decisions taken by the base station concerning the interferer terminals that it serves with an open temporary identifier.

In this way, the terminals of the neighbor cells can easily and efficiently implement an SIC receiver.

Of course, the size of the additional code depends on the number of interferer terminals sharing the some open temporary identifier. However, in practice it is of a size far smaller than the size of a temporary network identifier used to identify a terminal among several terminals on a network. For information purposes, for an LTE network, such an identifier (RNTI) is represented by 16 bits.

Thus for example, if eight interferer terminals share a same open temporary identifier, only three bits are necessary to signal for which interferer terminal the control channel encoded with this open temporary identifier is intended. The number of interferer terminals sharing a some open temporary identifier is chosen as a function of a compromise between complexity, necessary signaling resources and performance, as it is a result of the scheme proposed by the invention that two terminals sharing a same open temporary identifier cannot be served by the base station of the cell to which they are attached in a same temporary transmission interval (or TTI).

The invention thus makes it possible to manage a larger number of interferer terminals while limiting the number of required open temporary identifiers, and thus the complexity of the decoding induced at the victim terminals.

Moreover, the open temporary network identifier and the code are sent to the interferer terminal by way of at least one configuration message, i.e. a message containing information for configuring the terminal. Such a configuration message is conventionally a signaling message managed by the upper layers of the network, typically by the radio resource management layer of the network. It can in particular by emitted over a shared physical channel (e.g. PDSCH channel in an LTE network).

Thus, only the additional code allocated to the interferer terminal, which is of modest size in relation to the open temporary identifier, is transmitted in the physical control channel in accordance with the invention, so that the limited resources of this dedicated physical channel are preserved, contrary to the prior art.

Note that the use of an additional code to designate, within the plurality of interferer terminals, the interferer terminal for which the control channel is intended is transparent for the victim terminals implementing an interference cancellation. This additional code has no importance for a victim terminal, as it is not involved in the transmission parameters allocated to the interferer terminal for which this control channel is intended. No additional complexity results from the presence of these codes in the physical control channels for the victim terminals, as the latter do not use them.

The invention thus has a favored but non-limiting application when the cellular telecommunications network is an LTE network and:
- the open temporary network identifier is an RNTI identifier;
- the physical control channel is a PDCCH channel; and
- the configuration message is an RRC (Radio Resource Control) signaling message.

In a particular embodiment of the invention, in the insertion step, the code is inserted into a field of a DCI (Downlink Control Information) format as defined in the document 3GPP TS 36.212, entitled "Evolved Universal Terrestrial Radio Access (E-UTRA); Multiplexing and channel coding", v11.1.0, Release 11, December 2012, if this field is not used.

Preferably, the code is inserted into a field of a 2, 2A, 2B, 2C or 2D DCI format.

Thus, the field into which the code is inserted is for example a "Modulation and coding scheme" (MCS) field of 2, 2A, 2B, 2C or 2D DCI format: this field is intended to indicate the modulation and encoding scheme applied to the second transport block and is unused if a single transport block is transmitted.

The invention can in this way be implemented easily using fields and formats already used in the LTE standard.

In a variant, the code can be inserted into a field specifically provided for this purpose.

In a favored embodiment, the signaling method further comprises a step of allocating to the interferer terminal a dedicated temporary network identifier reserved for this interferer terminal and identifying it uniquely on the cell of the network to which it is attached.

In other words, the interferer terminal is allocated at a given moment two temporary network identifiers, its dedicated identifier which is independent of its status of potential interferer, and an open identifier published to the other terminals. In this way, it is possible to make sure that the interferer terminal is always accessible by the base station via its dedicated temporary identifier. This can be particularly advantageous when the interferer terminal is not interfering with another terminal in a given TTI and it is thus not necessary to serve it using an open temporary identifier that is published to the other terminals, whereas another terminal sharing the same open temporary identifier happens to be an interferer terminal in this TTI and it is therefore useful to serve it using this shared temporary identifier.

The invention relies not only on the base station implementing a signaling method to allocate to an interferer terminal an open temporary identifier and an additional code, and inform the interferer terminal of this attribution, but also on the interferer terminal proper which is capable of determining from the additional code that a control channel is intended for it and extracting from this control channel the transmission parameters that are allocated to it for communicating.

According to another aspect, the invention thus also provides a communication method, intended to be implemented by an interferer terminal attached to a cell of a cellular telecommunications network, this cell being controlled by a base station, the interferer terminal being capable of interfering with at least one communication established by another terminal of said cell or of a neighbor cell to this cell, the communication method comprising:
- a step of receiving at least one configuration message originating from the base station, comprising a so-called open temporary network identifier published or intended to be published by the base station and a code allocated to the interferer terminal;
- a step of decoding a physical control channel allocating resources for transmitting over the cellular network using said open temporary network identifier;
- a step of verifying the presence of the code allocated to the interferer terminal in he decoded physical channel; and
- if the code is present in the decoded physical channel, a step of using the transmission resources allocated in this channel to communicate over the cellular network.

Correlatively, the invention also concerns a terminal attached to a cell of a cellular telecommunications network, said cell being controlled by a base station, this terminal being capable of interfering with at least one communication established by another terminal attached to said cell and/or to a neighbor cell of said cell, and comprising:
- a module for receiving at least one configuration message originating from the base station, comprising a so-called open temporary network identifier published or intended to be published by the base station and a code allocated to the terminal;
- a module for decoding a physical control channel allocating resources for transmitting over the cellular network using the open temporary network identifier;
- a module for verifying the presence of the code allocated to the terminal in the decoded physical channel; and
- a module, activated if the code is present in the decoded physical channel, for using the transmission resources allocated in this channel to communicate over the cellular network.

The invention also provides a system of a cellular telecommunications network comprising:
- a base station in accordance with the invention controlling at least one cell of the cellular telecommunications network;
- an interferer terminal in accordance with the invention attached to this cell; and
- a terminal interfered on by the transmission from the base station to this interferer terminal, this interfered terminal being attached to the cell of the interferer terminal or to a cell of the network neighbor of this cell, and being capable of implementing an interference cancellation technique using the open temporary network identifier allocated to the interferer terminal and published by the base station.

The communication method, the terminal and the system boast advantages similar to the base station and the signaling method.

In a particular embodiment, the various steps of the signaling method and the communication method are determined by computer program instructions.

As a consequence, another aim of the invention is a computer program on an data storage medium, this program being able to be implemented in a base station or more generally in a computer, this program including instructions suitable for the implementation of the steps of a signaling method as described above.

Another aim of the invention is a computer program on an data storage medium, this program being capable of being implemented in a terminal or more generally in a computer, this program including instructions suitable for the implementation of the steps of a communication method as described above.

Each of these programs can use any programming language, and be in the form of source code, object code, or intermediate code between source code and object code, such as in a partly compiled form, or in any other desirable form.

Another aim of the invention is a computer readable data storage medium readable by a computer, and including instructions for a computer program as mentioned above.

The data medium can be any entity or device capable of storing the program. For example, the medium can include storage means, such as a ROM, for example a CD ROM or a microelectronic circuit ROM, or else magnetic recording means, for example a floppy disc or a hard disc.

In addition, the data medium can be a transmissible medium such as an electrical or optical signal, which can be conveyed via an electrical or optical cable, by radio or by other means. The program in accordance with the invention can in particular be downloaded on a network of Internet type.

Alternatively, the data medium can be an integrated circuit wherein the program is incorporated, the circuit being suitable for executing or for being used in the execution of the method in question.

It is also possible to envision, in other embodiments, that the signaling method, the communication method, the base station, the terminal and the system in accordance with the invention have in combination all or part of the aforementioned features.

BRIEF DESCRIPTION OF THE DRAWINGS

Other features and advantages of the present invention will become apparent from the description given below, with reference to the appended drawings which illustrate embodiments thereof which are in no way limiting in nature. In the figures:

FIG. 4 represents, in the form of a block diagram, the main steps of a signaling method in accordance with the invention in a particular embodiment wherein it is implemented by the base station in FIG. 1; and FIG. 5 represents, in the form of a block diagram, the main steps of a communication method in accordance with the invention in a particular embodiment wherein it is implemented by the terminal in FIG. 1.

DETAILED DESCRIPTION OF THE INVENTION

Figure 1:
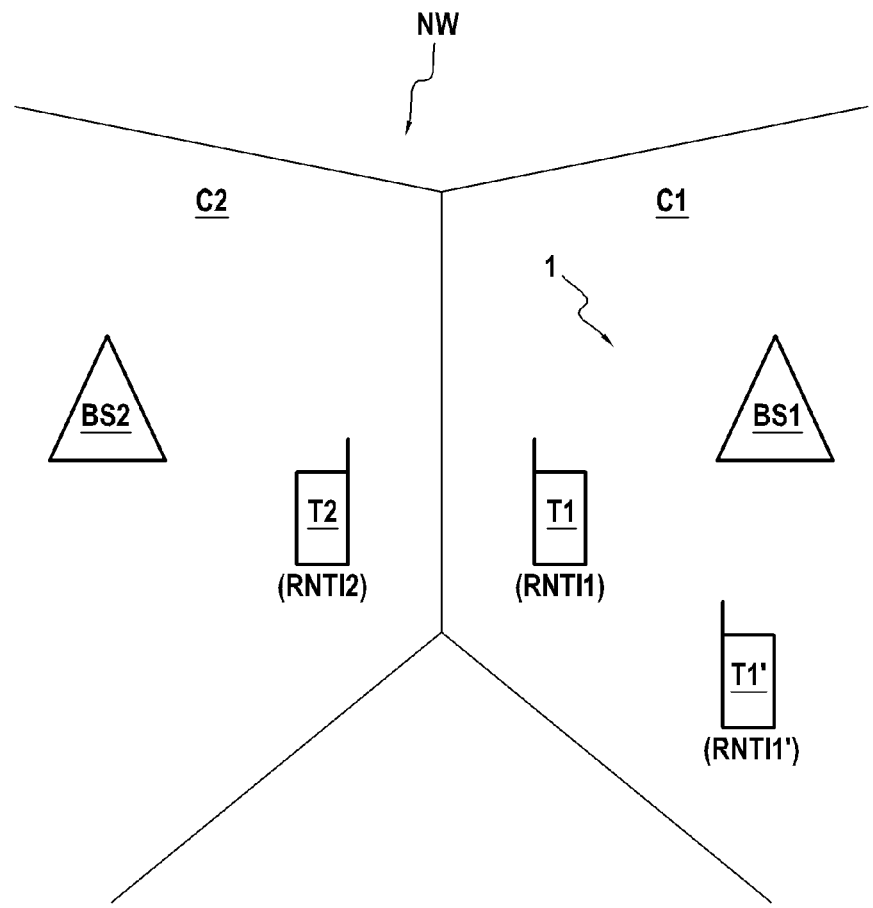
FIG. 1 schematically represents a system of a telecommunications network, a base station and a terminal in accordance with the invention, in a particular embodiment.

FIG. 1 shows, in its environment, a system 1 of a cellular telecommunications network NW, in accordance with the invention, in a particular embodiment.

In this particular embodiment, the cellular telecommunications network NW is an LTE mobile network, as defined by 3GPP. Each cell of the network NW is controlled by a base station (or eNodeB) serving the various terminals (or UEs for User Equipments) attached to the cell.

By way of illustration, two cells C1 and C2 of the cell network NW are represented in FIG. 1, the cell C1 being controlled by the base station BS1 and the cell C2 being controlled by the base station BS2. Each base station serves one or more terminals present in the cell(s) that it controls. Thus, in FIG. 1, it is considered that a terminal T1 and a terminal T1' are attached to the cell C1 and served by the base station BS1, and a terminal T2 attached to the cell C2 and served by the base station BS2.

Of course no limitation is attached to the number of base stations in consideration, nor to the number of cells managed by a same base station, nor even to the number of terminals attached to each cell.

In accordance with the LTE standard, each terminal attached to a cell is allocated a temporary network identifier known as RNTI by the base station controlling this cell, in order to communicate over the network NW. In a manner known to those skilled in the art, this RNTI identifier is a dedicated identifier, i.e. reserved to the terminal and which identifies it uniquely on the cell to which it is attached. Thus, in the example considered here, the base station BS1 attributes a dedicated temporary network identifier RNTI1 to the terminal T1 and a dedicated temporary network identifier RNTI1' to the terminal and the base station BS2 allocates a dedicated temporary network identifier RNTI2 to the terminal T2.

To better illustrate the invention, it is assumed here that the terminal T1 is capable of interfering with communications on the network NW of the terminal T1' attached to the same cell as it, i.e. the cell C1 (by creating MU-MIMO interference for example), as well as communications over the network NW of the terminal T2 attached to the cell C2 (intercellular interference). In other words, the terminal T1' and the terminal T2 are the victims of interference generated by transmissions originating from the base station BS1 and intended for terminal T1.

Of course, these assumptions are not limiting per se, as a terminal can be an interferer terminal for certain terminals (i.e. the transmissions from the network toward this interferer terminal constitute interference for the communications established by these terminals), and undergo interference (i.e. be interfered on) generated by other terminals (i.e. by the transmissions from the network toward these other terminals).

In accordance with the invention, the system 1 comprises:
- at least one base station in accordance with the invention controlling at least one cell of the cellular telecommunications network. This base station is in the example considered here the base station BS1 that controls the cell C1;
- at least one interferer terminal attached to this cell, namely, in the example considered in FIG. 1, the terminal T1; and
- at least one terminal interfered on by this interferer terminal, and attached to the cell of the interferer terminal or to a neighbor cell of the network: in the case here, two interfered terminals are considered, namely terminals T1' and T2.

No limit is however attached to the numbers of the interferer and interfered terminals in consideration, nor to the type of interference created by the interferer terminal. Thus the invention applies as well in the presence of MU-MIMO interference generated within one and the same cell as described previously, and/or in the presence of intercellular interference between signals intended for terminals attached to neighbor cells.

The terminals T1, T1' and T2 can be terminals of any kind capable of communicating over the LTE network NW, such as for example mobile phones, smartphones, laptop computers etc.

In the embodiment described here, for the sake of simplicity, the terminals T1, T1' and T2 are all LTE terminals in accordance with the invention, each equipped with a non-linear receiver of MMSE-SIC type, or in other words a non-linear receiver employing a successive interference cancellation technique. Such receivers are known per se and will not be further described here: thus, by may of example, they may be non-linear receivers employing hard decision channel decoding, or non-linear receivers employing soft decision turbo (or iterative) channel decoding, as notably described in the contribution R1-090232, 3GPP TSG RAN WG1, of January 2009 entitled "Comparing performance, complexity and latency of SC-FDMA SIC and OFDM MLD".

Figure 2:
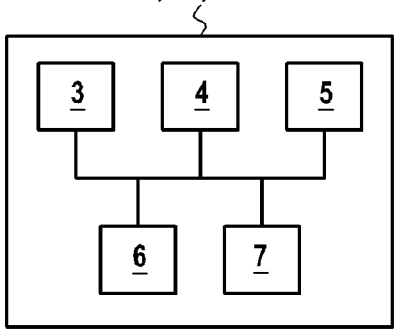
FIGS. 2 and 3 schematically represent the hardware architecture of the base station and the terminal illustrated in FIG. 1.

In the embodiment described here, these terminals have the hardware architecture of a computer, as illustrated in FIG. 2.

More specifically, each terminal notably comprises a processor 3, a read-only memory 4, a random-access memory 5, a non-volatile memory 6 and means 7 for communicating over the LTE telecommunications network NW, known per se.

The read-only memory 4 of each terminal forms a storage medium in accordance with the invention, readable by the processor 3 and on which is stored a computer program including instructions for executing the steps of a communication method in accordance with the invention, the steps of which will be described later with reference to FIG. 5 in a particular embodiment. This computer program defines, in an equivalent way, software and functional modules of the terminals T1, T1' and T2 capable of executing the various steps of the method of communication and of interacting with the components of the terminals described previously with reference to FIG. 2, such as notably a module for receiving configuration messages, originating from the upper layers of the network NW and more precisely from the radio resource management layer also known as RRC layer, containing an open RNTI temporary identifier and an additional code, a module for decoding a PDCCH physical channel using the open RNTI temporary identifier, a module for verifying that this PDCCH physical channel comprises the additional code and a module for using the transmission resources allocated in the PDCCH physical channel when the latter comprises the additional code.

Note that it is not necessary for the implementation of the invention that all terminals able to communicate over the network NW implement a nonlinear receiver using an interference cancellation technique.

Similarly, all terminals able to communicate over the network NW are not necessarily in accordance with the invention, in other words, configured so as to be able to decode the open temporary identifiers allocated by their respective base station in order to allow the other terminals to cancel the interference that they generate. Thus, in the example considered here, it suffices that T1 is in accordance with the invention, and that the terminals T1' and T2 are able to decode a PDCCH channel coded using an open RNTI temporary identifier allocated by the base station BS1 to terminal T1, and to apply an interference cancellation method to the interfering signals emitted by the base station BS1 intended for the terminal T1 using the transmission parameters obtained by decoding the PDCCH channel emitted by the base station BS1 over the cell C1.

As mentioned previously, the base station BS1 is in accordance with the invention.

Figure 3:
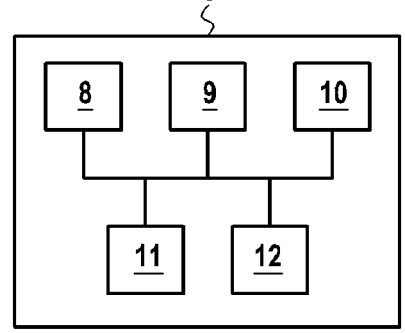

In the embodiment described here, it possesses the hardware architecture of a computer, as illustrated in FIG. 3, and notably comprises a processor 8, a read-only memory 9, a random-access memory 10, a nonvolatile memory 11 and means 12 for communicating over the LTE telecommunications network NW, known per se. These communication means 12 in particular allow it to communicate first with the terminals attached to the cell C1 and secondly with the base stations of the neighbor cells, such as for example with the base station BS2 of the cell C2.

The read-only memory 9 of the base station BS1 forms a storage medium in accordance with the invention, readable by the processor 8 and on which is stored a computer program including instructions for executing the steps of a signaling method in accordance with the invention, the steps of which will be described later with reference to FIG. 4 in a particular embodiment.

This computer program defines, in an equivalent way, software and functional modules of the base station capable of executing the various steps of the method of signaling and of interacting with the components of the base station BS1 described previously with reference to FIG. 3, such as notably a module for allocating to an interferer terminal (e.g. T1), an open temporary identifier RNTI, shared by a predetermined number of interferer terminals attached to the cell C1, and a code making it possible to identify the interferer terminal among the plurality of interferer terminals, a module for publishing this open temporary network identifier to the terminals of cell C1 and/or the base stations of the neighbor cells (e.g. BS2), a module for sending at least one RRC signaling message to the interferer terminal comprising the open temporary network identifier and the code allocated to the interferer terminal, a module for inserting the code into a field of a PDCCH physical channel allocating transmission resources to the interferer terminal, a module for encoding the PDCCH physical channel using the open RNTI identifier allocated to the interferer terminal, and a module for sending the encoded PDCCH physical channel over the cellular network NW.

We will now describe with reference to FIGS. 4 and 5, the main steps of a method for signaling and a method for communicating in accordance with the invention, in a particular embodiment wherein these steps are implemented respectively by the base station BS1 and by the terminal T1 in FIG. 1.

As mentioned previously, it is assumed that the terminal T1 is an interferer terminal, in other words that it is capable of interfering with the communications established by other terminals over the network NW.

For the sake of simplicity, we will limit the description to an intercellular interference generated by the transmissions from the base station BS1 toward the terminal T1 attached to the cell C1 on the communications of the terminal T2 attached to the cell C2, The processing of MU MIMO type interference capable of being generated by the transmissions intended for terminal T1 on the communications of the terminal T1' attached to the cell C1 is addressed later.

It is assumed that in a preliminary step, the base station BS1 selects, from among all the RNTI temporary identifiers available for the cell C1, a subset of so-called "open" RNTI identifiers, intended to be published to the neighbor cells and the terminals of cell C1 (step E10 in FIG. 4).

In the embodiment described here, the selected subset corresponds to a range comprising a limited number of contiguous RNTI identifiers, for example 1, 4, 8 or 16 identifiers.

In accordance with the invention, each open RNTI identifier selected is intended to be shared by a group of K terminals identified as potential interferer terminals by the base station BS1. K is a predetermined number, for example here K=8.

In the embodiment described here, the base station BS1 publishes (i.e. broadcasts) the selected open RNTI identifiers, to the base stations of the neighbor cells of the cell C1 and particularly to the base station BS2 (step E20).

As mentioned previously, the term "publication" is understood to mean the fact of bearing the open RNTI temporary identifiers to the knowledge of other terminals, in other words making them public, so as to facilitate the decoding by these other terminals of the PDCCH physical channels associated with these identifiers (in other words, encoded with these identifiers), and thus determine the transmission parameters allocated to the terminals to which these open temporary network identifiers are allocated, in order to suppress the interference generated by them.

This publication is done by the base station BS1 via the sending of a signaling message containing the list of selected open RNTI identifiers.

This signaling message can be emitted by the base station BS1 to the base stations of the neighbor cells over the interface X2 of the LTE network NW, conditional on the definition of a new appropriate message. The interface X2 is known to those skilled in the art: its role is to allow the transport of data packets and items of control information between the base stations of the network NW. It is particularly defined in the 3GPP document 36.423.

In a variant, the base station BS1 can emit the signaling message containing the list of selected open RNTI identifiers, over a connection of fiber point-to-point type established with the base stations of the neighbor cells (and in particular with the base station BS2).

In another embodiment wherein the base station BS1 controls several separate cells, the base station BS1 transmits a signaling message containing the list of open RNTI identifiers of the cell C1 to the terminals of the cells that it controls and which are neighbors of the cell C1. For this purpose, the base station BS1 relies for example on the signaling managed by the RRC layer for managing the radio resources of the network. This RRC layer is notably defined in document 3GPP TS 36.331 entitled "Evolved Universal Terrestrial Radio Access (E-UTRA); Radio Resource Control (RRC); Protocol Specification", Release 11, December 2012. The RRC signaling message sent by the base station BS1 is emitted over a shared physical channel PDSCH. In this way, no network interface is necessary for this signaling.

Note that the selection of a range of contiguous open RNTI identifiers allows more spectrally efficient signaling. Specifically, to signal the list of open RNTI identifiers selected by the base station BS1, it suffices that the signaling message emitted by the base station BS1 contains a number indicating the number of the first open RNTI identifier of the range, and of a number indicating the number of open RNTI identifiers selected by the base station BS1.

In a variant, the signaling message emitted by the base station BS1 to the base stations of the neighbor cells contains each open RNTI identifier selected by the base station BS1 and coded on 16 bits.

The list of open RNTI identifiers selected by the base station BS1 is received by the base stations of the neighbor cells, and notably by the base station BS2.

The base station BS2 (as well as the other base stations) then publishes in turn the list of open RNTI identifiers selected by the base station BS1, to the terminals attached to the cell C2, in a signaling message. This signaling message is for example a RRC signaling message emitted by the base station BS2 over a shared physical channel PDSCH.

Note that in the example considered here, we are limited to the cancellation of intercellular interference so that the open RNTI identifiers are only signaled by the base station BS1 to the base stations of the neighbor cells. However, when cancellation of interference of MU-MIMP type generated within the cell C1 is also considered, the base station BS1 also publishes the selected open RNTI identifiers to the mobile terminals of its cell C1, for example by sending an RRC signaling message.

As described previously, in accordance with the LTE standard, the base station BS1 also allocates a dedicated temporary RNTI identifier to each terminal attached to its cell C1 (step E30). Thus, in the example considered here, it allocates the temporary identifier RNTI1 to the terminal T1. This identifier RNTI1 is, unlike the open RNTI identifiers selected in step E10, reserved for the terminal T1, in other words, it uniquely identifies the terminal T1 on the cell C1.

It is sent by the base station BS1 to the terminal T1 in an RRC signaling message (configuration message in the sense of the invention), in a manner known to those skilled in the art, and is received by the latter (step F10 in FIG. 5).

From that point, the base station BS1 can send to the terminal T1, PDCCH physical channels coded using this identifier RNTI1, to signal particularly to it the transmission parameters that it has allocated to it (notably including the modulation and coding scheme, the physical resource blocks PRB, the dedicated DMRS pilot sequence allocated) and the terminal T1 can decode the PDCCH physical channels that are intended for it and are encoded using this identifier RNTI1 and use the transmission parameters contained in these PDCCH physical channels to communicate over the network NW.

The coding and decoding of the PDCCH physical channels using an RNTI identifier as well as the allocation of the transmission parameters by the base station BS1 to the terminal T1 for an LTE network are described in more detail in documents TS 36.212 and TS 36.213 mentioned previously and will not be further described here.

We will now assume that the base station BS1 determines that the terminal T1 is capable of creating interference toward neighbor cells (i.e. the transmissions from the base station BS1 towards the terminal T1 are capable of interfering with the communications of the terminals of the neighbor cells), and particularly toward the terminals of the cell BS2 (step E40), for example because the terminal T1 requests a radio resource-consuming service over a fairly long time period (e.g. stream broadcasting service) and will therefore occupy a wide bandwidth over a long time. In other words, it detects that the terminal T1 is an interferer terminal in the sense of the invention.

In a variant, other criteria can be considered at the base station BS1 for detecting that a terminal is capable of interfering with the communications of the terminals of the neighbor cells of cell C1 (or even of cell C1) such as for example the fact that the terminal is at the edge of the cell, etc. Such criteria are described in particular in the document WO 2010/108136.

In a variant, the base station BS1 can detect that a terminal is capable of interfering with the communications of the terminals of the neighbor cells of the cell C1 using an exchange of information with the base stations controlling these neighbor cells. This detection can be carried out in each TTI when the base stations communicate over a connection of point-to-point fiber type. For example, the neighbor base station BS2 can inform the base station BS1 of the planned use of certain radio resources by the terminal T2 in a future TTI, so that the base station BS1 knows that if it uses these resources for the terminal T1 in this future TTI, the transmission to the terminal T1 will create intercellular interference for the terminal T2.

Following this detection, the base station BS1 allocates to the terminal T1 an open RNTI identifier, denoted RNTIo1, chosen from among the open RNTI identifiers selected in step E10, and broadcast to the base stations of the neighbor cells to cell C1 (step E50). In the embodiment described here, this identifier RNTIo1 is allocated to the terminal T1 in addition to its dedicated temporary identifier RNTI1.

This identifier RNTIo1 being able to be shared in accordance with the invention by several interferer terminals, the base station BS1 also allocates to the terminal T1, in this step E50, an additional distinguishing code COD1, in order to be able to identify the terminal T1 among the plurality of interferer terminals sharing the open identifier RNTIo1.

The additional code COD1 is for example a code comprising $\log_2(K)$ bits (or 3 bits in the example considered previously where K=8 interferer terminals share the same open temporary identifier). For example, COD1=001.

The base station BS1 then sends over the PDSCH channel a dedicated configuration message to the terminal T1 containing firstly the open identifier RNTIo1 and also the additional code COD1="001" of 3 bits that have been allocated to it (step E60). Here this configuration message is an RRC signaling message managed by the RRC radio resource control (i.e. management) layer of the network.

This RRC configuration message is received by the terminal T1 (step F20 in FIG. 5). From that point, the terminal T1 must monitor, firstly the search space corresponding to its dedicated identifier RNTI1, and secondly, the search space corresponding to its open identifier RNTIo1: in other words, it must decode all the PDCCH channels emitted by the base station BS1 and encoded either with the dedicated identifier RNTI1, or with the open identifier RNTIo1. Note however that only PDCCH channels containing the additional code COD1 are intended for the terminal T1.

Once the shared open identifier RNTIo1 and the code COD1 are signaled to the terminal T1, the base station can inform the terminal T1 of the transmission parameters (and equivalently, the network resources) that it allocates to it (particularly the modulation and coding schemes MCS and the PRB blocks), in a PDCCH physical channel encoded with the open identifier RNTIo1 and transmitted over the search space associated with this open identifier RNTIo1.

To allow the terminal T1 to detect that such a PDCCH channel allocating transmission resources over the network NW is intended for it, in accordance with the invention, the base station BS1 inserts into this PDCCH channel encoded using the open identifier RNTIo1, the additional code COD1 in a field of the DCI format of the PDCCH channel (step E70).

For this purpose, the code COD1 can be inserted into an unused field of the DCI format if such a field exists.

For example, if a single transport block, instead of the two authorized by the standard, is transmitted by the terminal T1, the field "Modulation and coding scheme (or MCS)" of the DCI format 2, 2A, 2B, 2C or 2D defined in the document 3GPP IS 36.212 corresponding to the second MCS modulation and coding scheme normally intended for the second transport block can be used to insert the code COD1. According to such an assumption, it is of course necessary to make sure that the dimension of the code COD1 is compatible with the size of this field.

In a variant, it is possible to envision adding a field to the different DCI formats which can be used for the PDCCH channel (a field not provided in the current state of the LIT standard), the size of which depends on the maximum number of interferer terminals that can share a same open identifier.

It will hence be understood that the number K of interferer terminals that can share a same open identifier results from a compromise between complexity, necessary signaling resources, and interference cancellation technique performance, while also ensuring that this number is compatible with the definition of the DCI format that can be used for the PDCCH physical channels.

Note that the PDCCH channels associated with the open RNTI identifiers being intended to be decoded by interfered terminals (for example by the terminal T2) in poor radio conditions from the point of view of the cell C1 (since they are served by another cell C1), generally require a high level of protection. This manifests as the use of a high aggregation factor to form these channels, which means that each PDCCH channel intended for an open RNTI identifier is preferably formed with a high number of elements or CCE (for Control Channel Element) (in an LTE network, according to the level of protection of the considered PDCCH channel, a PDCCH channel can generally be formed of 1, 2, 4 or 8 CCEs). The number of candidate resource combinations to be tested during the search for PDCCH channels by the terminal T2, which depends on this aggregation factor, is consequently relatively small. The additional complexity related to the invention can consequently be limited.

It is moreover possible to deliberately reduce the number of DCI formats eligible for transmission using an open RNTI identifier, in order to limit the complexity of the search for PDCCH channels performed by the interfered terminals. A slight increase in the search complexity can however by tolerated for terminals capable of carrying out a MMSE-SIC reception, because the latter are provided with greater computational capacity. In order for this increase in complexity to avoid harming other terminals however, it is possible to use open RNTI identifiers only for terminals capable of implementing interference cancellation using an MMSE-SIC technique.

The terminal T1 monitors for each transmission time interval (ITT), the search space corresponding to the open identifier RNTIo1 (in addition to the search space corresponding to its dedicated identifier RNTI1).

More precisely, on receiving a PDCCH control channel on the search space corresponding to the open identifier RNTIo1 (step F30), the terminal T1 decodes this PDCCH control channel using the identifier RNTIo1, in a manner known per se (step F40).

Then the terminal T1 verifies that the code COD1 is present in the PDCCH channel thus decoded (test step F50), in the field of the DCI format provided for this purpose.

If the code COD1 is not present in this field ("no" reply to the test step F50), this means that the PDCCH channel received is not intended for the terminal T1. The terminal T1 therefore does not take into account the information contained in the PDCCH channel (and particularly the transmission parameters included in this channel) (step F60).

On the other hand, if the code COD1 is present in this field ("yes" reply to the test step F50), this means that the PDCCH channel received is intended for the terminal T1. The latter extracts the transmission parameters included in the channel.

From that point it uses the resources designated by these transmission parameters when't communicates over the network NW (step F70).

It is assumed that at the same time (i.e. in the same TTI), the cell C2 serves the terminal T2, capable of implementing a MMSE-SIC receiver as previously described.

The terminal T2 has moreover been informed by the base station BS2 of the list of open identifiers (containing particularly the open identifier RNTIo1) selected by the base station BS1 and intended for the interferer terminals of the cell C1 capable of interfering with the communications of other terminals (including in particular those of the cell C2).

The terminal T2 decodes, using its dedicated temporary identifier RNTI2 (allocated by the base station BS2 in a manner known per se, the PDCCH channels that are transmitted to it in the TTI over the search space associated with this identifier. The terminal T2, detecting that data are intended for it in this TTI, attempts to decode the PDCCH channels that may have been transmitted by the base station BS1 on the search spaces corresponding to the open identifiers of which it has been informed, and particularly over the search space corresponding to the identifier RNTIo1.

Where applicable (i.e. if it detects and decodes a PDCCH channel associated with the open identifier RNTIo1), this decoding advantageously allows the terminal T2 to identify the transmission parameters allocated to the terminal T1 over this TTI, and to determine if the resources used by the terminal T1 to communicate over the network NW deduced from these parameters coincide or correspond (in part only or totally) with the resources that it uses itself to communicate. This decoding allows the terminal T2 to determine whether or not the terminal T1 is an interferer and if it must attempt to cancel the interference generated by T1 using its MMSE-SIC receiver, taking into account the transmission parameters allocated to the terminal T1 for this same TTI.

If this is the case, the terminal T2 can then, using the knowledge of these transmission parameters, decode the interfering signal of the terminal T1 with success then cancel the corresponding interference which makes it possible to improve the quality of its radio link for the detection of the useful signal that is intended for it.

In other words, the invention facilitates the application of interference cancellation techniques in the case where an intercellular interference exists between two terminals, and this with a reasonable complexity in terms of signaling.

Note that the field of the DCI format containing the code COD1 has no effect on the terminal 12 since it is not involved in the capacity of decoding the PDCCH channel by the terminal T2 or in the specification of the transmission parameters of the terminal T1 for which this PDCCH is intended.

Moreover, in order to improve the performance of the system 1 and the interference cancellation, it is possible to implement prior coordination between the base stations BS1 and BS2 to ensure that the coding and modulation scheme of the terminal T1 is decodable by the terminal 12 (during the application of the interference cancellation method), and that the data rate offered to the terminal T2 takes into account the improved performance of the terminal T2 due to the interference cancellation via the knowledge of the transmission parameters allocated to T1 easily allowed by the invention. The terminal T2 can thus receive a better instantaneous data rate in this TTI than if it had only employed one linear receiver.

Note that all the terminals of the cell C1 do not necessarily consume enough resources to generate interference damaging to the communications of the terminal T2, and that therefore needs cancelling. Specifically, if the terminal T2 is served on a high number of PRB resource blocks (for example 25) but is only interfered on by the transmission of one PRB resource block from the cell C1 to the terminal 11, this interference causes few damage and does not necessarily require the application of an MMSE-SIC receiver to reduce it. The terminals that do not need to receive a PDCCH channel decodable by other terminals can be constantly served on their dedicated RNTI identifier. These terminals can be advantageously configured not to have to search their PDCCH channel according to open temporary network identifiers, which makes it possible to save on their battery consumption.

As mentioned previously, the example illustrated with reference to FIGS. 1-5 concerns the cancellation of intercellular interference between two terminals T1 and 12 served by base stations BS1 and BS2 controlling separate neighbor cells C1 and C2. However, the invention is also applicable in a context in which one seeks to cancel an interference of MU-MIMO type generated within one and the same cell (for example by the communications from the terminal T1 on the communications of the terminal T1'). Similar steps to those described previously for the cancellation of intercellular interference can then be employed, providing the publication of the list of open RNTI identifiers to the terminals attached to the cell C1 (such as for example to the terminal T1').

Similarly, the invention is also applicable in a context in which both intercellular interference and MU-MIMO interference must be cancelled.

The invention claimed is:

1. A signaling method for implementation by a base station of a cellular telecommunications network, the base station controlling a cell of the cellular telecommunications network, the signaling method comprising:
    allocating, to an interferer terminal attached to the cell and identified by the base station as being capable of interfering with at least one communication established by another terminal attached to the cell or to a neighbor cell:
        an open temporary network identifier shared by a predetermined number of interferer terminals attached to the cell controlled by the base station;
        a code, separate from the open temporary network identifier, identifying the interferer terminal among the predetermined number of interferer terminals; and
        a non-open dedicated temporary network identifier reserved for the interferer terminal and identifying the interferer terminal uniquely on the cell of the cellular communications network controlled by the base station;
    publishing the open temporary network identifier to terminals attached to said cell, to terminals attached to at least one other cell controlled by the base station and neighboring the cell, or to at least one base station controlling a neighbor cell of the cell;
    sending to the interferer terminal, in at least one configuration message, the open temporary network identifier, the non-open dedicated temporary network identifier, and the code; and
    inserting the code, in a field of a physical control channel allocating resources for transmitting over the cellular telecommunications network to the interferer terminal, the physical control channel being encoded using the open temporary network identifier allocated to the interferer terminal and transmitted on the cellular communications network.

2. The signaling method according to claim 1, wherein the configuration message is a signaling message managed by a layer for managing the radio resources of the cellular communications network.

3. The signaling method according to claim 1, wherein publishing the open temporary network identifier comprises broadcasting the open temporary network identifier to the terminals attached to the cell.

4. The signaling method according to claim 1, wherein publishing the open temporary network identifier comprises broadcasting the open temporary network identifier to the terminals attached to the at least one other cell controlled by the base station and neighboring the cell.

5. The signaling method according to claim 1, wherein publishing the open temporary network identifier comprises broadcasting the open temporary network identifier to the at least one base station controlling a neighbor cell of the cell.

6. The signaling method according to claim 1, wherein the cellular telecommunications network is an LTE (Long Term Evolution) network and:
    the open temporary network identifier is an open RNTI (Radio Network Temporary Identifier) identifier;
    the physical control channel is a PDCCH (Physical Downlink Control CHannel) channel; and
    the configuration message is an RRC (Radio Resource Control) signaling message.

7. The signaling method according to claim 6 wherein inserting the code comprises inserting the code into a field of a DCI (Downlink Control Information) format as defined in the document 3GPP TS 36.212.

8. The signaling method according to claim 7 wherein said field is a "Modulation and coding scheme" field, of a 2, 2A, 2B, 2C or 2D DCI format.

9. A computer program including instructions for executing the steps of the signaling method according to claim 1 when said program is executed by a computer.

10. A non-transitory data storage medium readable by a computer on which is stored a computer program comprising instructions for executing the steps of the signaling method according to claim 1.

11. A base station of a cellular telecommunications network, said base station controlling a cell of the cellular communications network and comprising a processor configured to:
    allocate, to an interferer terminal attached to the cell and identified as being capable of interfering with at least one communication established by another terminal attached to the cell or to a neighbor cell:
        an open temporary network identifier, shared by a predetermined number of interferer terminals attached to the cell controlled by the base station;
        a code, separate from the open temporary network identifier, identifying the interferer terminal among the predetermined number of interferer terminals; and
        a non-open dedicated temporary network identifier reserved for the interferer terminal and identifying the interferer terminal uniquely on the cell of the cellular communications network controlled by the base station;

publish the open temporary network identifier to terminals attached to the cell, to terminals attached to at least one other cell controlled by the base station and neighboring the cell, or to at least one base station controlling a neighbor cell of the cell;
send to the interferer terminal, in at least one configuration message, the open temporary network identifier and the code;
insert this code in a field of a physical control channel allocating resources for transmitting over the cellular telecommunications network to the interferer terminal; and
encode the physical control channel using the open temporary network identifier allocated to the interferer terminal;
wherein the base station transmits the physical control channel over the cellular telecommunications network.

12. The base station of claim 11, wherein the configuration message is a signaling message managed by a layer for managing the radio resources of the cellular telecommunications network.

13. The base station of claim 11, wherein the processor is configured to publish the open temporary network identifier by broadcasting the open temporary network identifier to the terminals attached to the cell.

14. The base station of claim 11, wherein the processor is configured to publish the open temporary network identifier by broadcasting the open temporary network identifier to the terminals attached to the at least one other cell controlled by the base station and that neighbors the cell.

15. The base station of claim 11, wherein the processor is configured to publish the open temporary network identifier by broadcasting the open temporary network identifier to the at least one base station controlling a neighbor cell of the cell.

16. The base station of claim 11, wherein the cellular telecommunications network is an LTE (Long Term Evolution) network and:
the open temporary network identifier is an open RNTI (Radio Network Temporary Identifier) identifier;
the physical control channel is a PDCCH (Physical Downlink Control CHannel) channel; and
the configuration message is an RRC (Radio Resource Control) signaling message.

17. A method of communication for implementation by an interferer terminal attached to a cell of a cellular telecommunications network, the cell being controlled by a base station, the interferer terminal being capable of interfering with at least one communication established by another terminal of the cell or of a neighbor cell to the cell, the method comprising:
receiving at least one configuration message originating from the base station, comprising an open temporary network identifier and a code, separate from the open temporary network identifier, allocated to the interferer terminal, the open temporary network identifier being published or intended to be published by the base station;
receiving a non-open dedicated temporary network identifier from the base station, the non-open dedicated temporary network identifier reserved for the interferer terminal and identifying the interferer terminal uniquely on the cell of the cellular telecommunications network controlled by the base station;
decoding a physical control channel allocating resources for transmitting over the cellular telecommunications network using the open temporary network identifier or the non-open dedicated temporary network identifier;
when the physical control channel is decoded using the open temporary network identifier,
verifying the presence of the code allocated to the interferer terminal in the decoded physical control channel; and
if the code is present in the decoded physical control channel, using transmission resources allocated in the physical control channel to communicate over the cellular telecommunications network.

18. A terminal attached to a cell of a cellular telecommunications network, said cell being controlled by a base station, said terminal being capable of interfering with at least one communication established by another terminal attached to said cell and/or to a neighbor cell of said cell, the terminal comprising a processor configured to:
receive at least one configuration message originating from the base station, comprising an open temporary network identifier and a code, separate from the open temporary network identifier, allocated to the terminal, the open temporary network identifier being published or intended to be published by the base station;
receive a non-open dedicated temporary network identifier from the base station, the non-open dedicated temporary network identifier reserved for the interferer terminal and identifying the interferer terminal uniquely on the cell of the cellular telecommunications network controlled by the base station;
decode a physical control channel allocating resources for transmitting over the cellular telecommunications network using the open temporary network identifier or the non-open dedicated temporary network identifier;
when the physical control channel is decoded using the open temporary network identifier,
verify the presence of the code allocated to the terminal in the decoded physical control channel; wherein
if the code is present in the decoded physical control channel, use transmission resources allocated in the physical control channel to communicate over the cellular telecommunications network.

* * * * *